United States Patent [19]

Colamussi

[11] Patent Number: 5,575,376
[45] Date of Patent: Nov. 19, 1996

[54] PRODUCT-HANDLING DEVICE ARRANGEMENT FOR PICK AND PLACE MACHINE

[75] Inventor: Arturo Colamussi, Fossalta, Italy

[73] Assignee: Vortex Systems S.r.L., Fossalta, Italy

[21] Appl. No.: 322,019

[22] Filed: Oct. 11, 1994

[30] Foreign Application Priority Data

Oct. 11, 1993 [IT] Italy .................. MI93A2149

[51] Int. Cl.$^6$ .................................. B65G 25/00
[52] U.S. Cl. .................. 198/468.3; 294/65; 414/752
[58] Field of Search .................. 414/750, 751, 414/752; 294/65; 901/12, 21, 40; 198/468.3

[56] References Cited

U.S. PATENT DOCUMENTS

| | | | |
|---|---|---|---|
| 4,329,112 | 5/1982 | Glover | 414/751 |
| 4,425,074 | 1/1984 | Becker et al. | 198/468.3 X |
| 4,595,335 | 6/1986 | Takahashi et al. | 414/750 X |
| 4,832,180 | 5/1989 | Ferrero | 198/468.3 |
| 4,911,598 | 3/1990 | Sarvary et al. | 198/468.3 X |

FOREIGN PATENT DOCUMENTS

| | | | |
|---|---|---|---|
| 0552395 | 7/1993 | European Pat. Off. | B65G 47/91 |
| 3128461 | 1/1985 | Germany | B65G 61/00 |
| 3636523 | 5/1988 | Germany | B65G 47/91 |

*Primary Examiner*—Donald W. Underwood
*Attorney, Agent, or Firm*—Cushman Darby & Cushman, L.L.P.

[57] ABSTRACT

A product handling device having at least one carriage provided with at least one product engagement element and movable between different positions, and a drive element for driving the at least one carriage between the different positions. With the at least one carriage there is associated at least one locator element interacting with external elements arranged to determine the limits of a preselectable travel path. A handling apparatus integrates into one structure of a plurality of such devices, mounted in common to a carriage for vertical and horizontal movement.

6 Claims, 5 Drawing Sheets

PRODUCT-HANDLING DEVICE ARRANGEMENT FOR PICK AND PLACE MACHINE

BACKGROUND OF THE INVENTION

This invention relates to a product handling device and to apparatus integrating a plurality of such devices into one structure mounted in common to a carriage for vertical and horizontal movement.

In systems for handling a product and/or groups of products which have to be picked up in a first position and/or mutual arrangement and deposited for subsequent treatment or packaging in a second position and/or arrangement, devices having a specific fixed and unchangeable location in the two arrangements are usually used. These devices therefore have to be replaced if the two desired arrangements are changed, because the gripping elements are mutually correlated by pneumatic or mechanical mechanisms having a predetermined and unchangeable travel path. This involves a loss of time and production on replacing the various units, together with considerable investment in the purchase of units with the different travel path required for handling products of different size and different mutual arrangement.

SUMMARY OF THE INVENTION

An object of the present invention is to provide a handling device enabling products to be picked up and product groups to be created in various mutual arrangements, which is extremely simple and such as to eliminate complicated mechanical and/or pneumatic mechanisms associated with it.

A further object is to provide a handling device which can be easily and quickly adapted to form different product arrangements. A further object is to provide a handling apparatus of rapidly changeable function, which is of simple and low-cost construction. These objects are attained according to the present invention by a product handling device comprising at least one carriage provided with at least one product engagement element and movable between different positions, and means for driving said at least one carriage between said different positions, characterised in that with the at least one carriage there is associated at least one locator element interacting with external elements arranged to determine the limits of a preselectable travel path.

BRIEF DESCRIPTION OF THE DRAWINGS

The structural and functional characteristics of a device and apparatus according to the present invention will be more apparent from the description given hereinafter by way of non-limiting example with reference to the accompanying drawings, in which.

DETAILED DESCRIPTION

Figure 1:
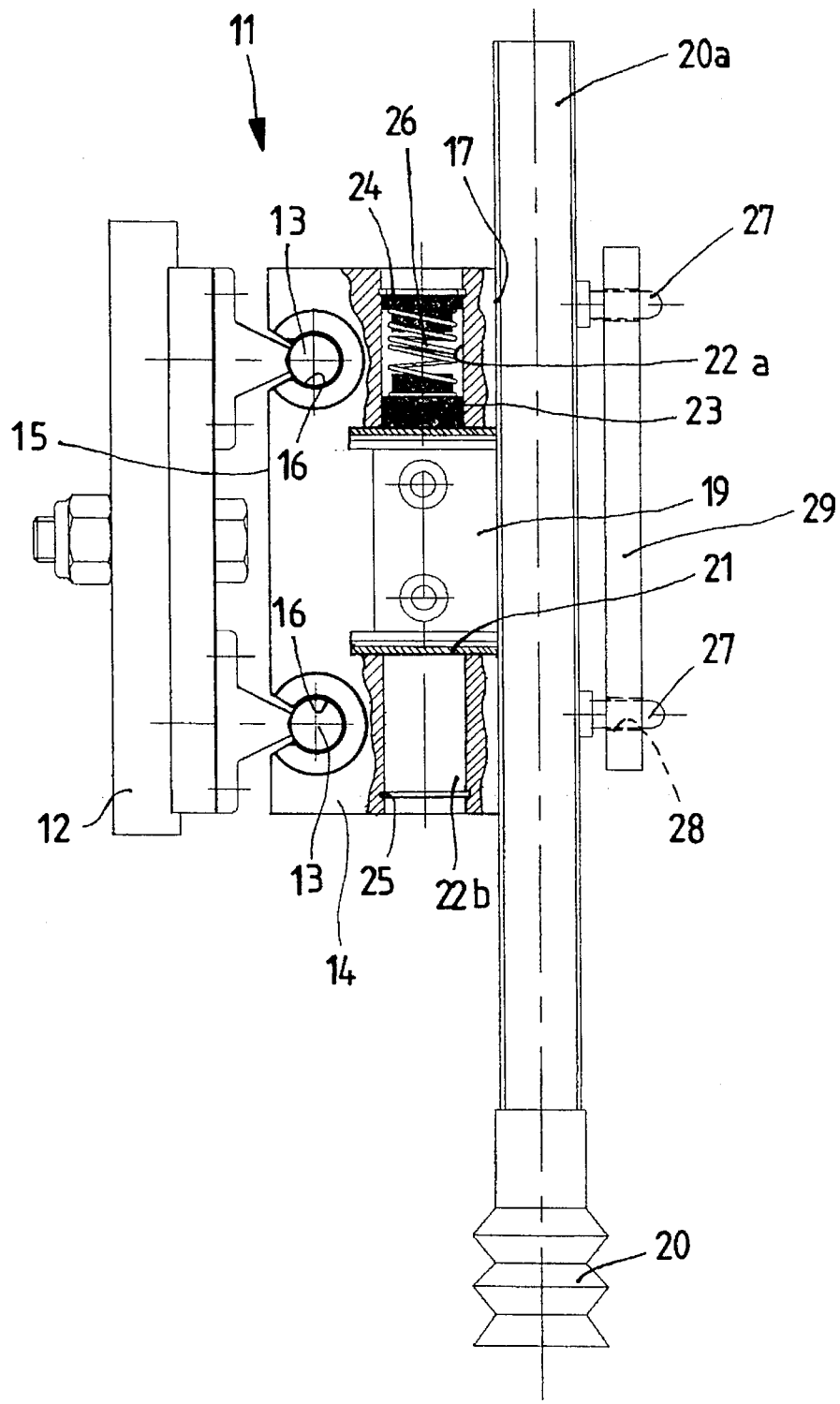
FIG. 1 is a partly sectional side elevation of a single handling device according to the invention.
Figure 2:
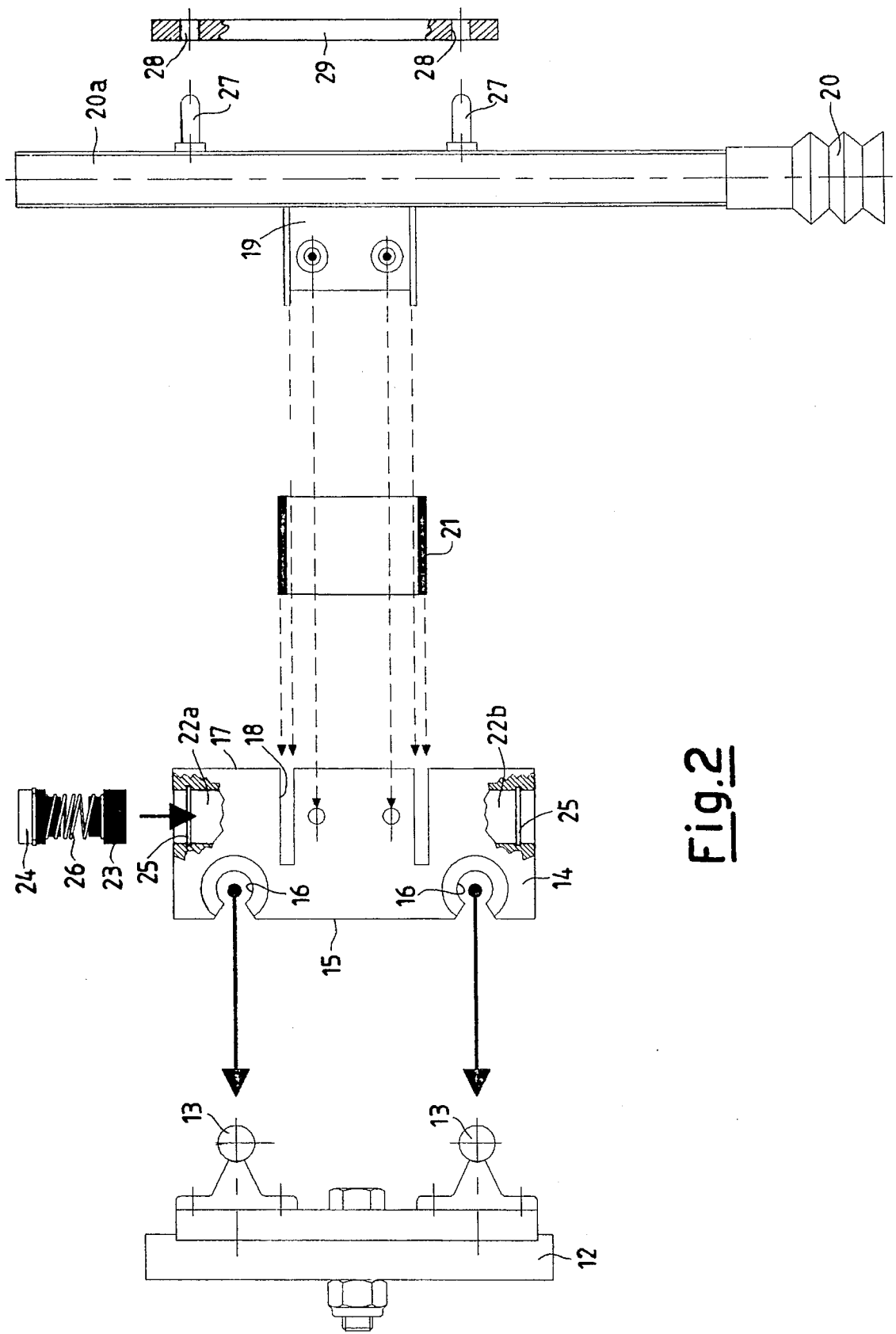
FIG. 2 is a partly sectional exploded side elevational view of the device of FIG. 1.
Figure 3:
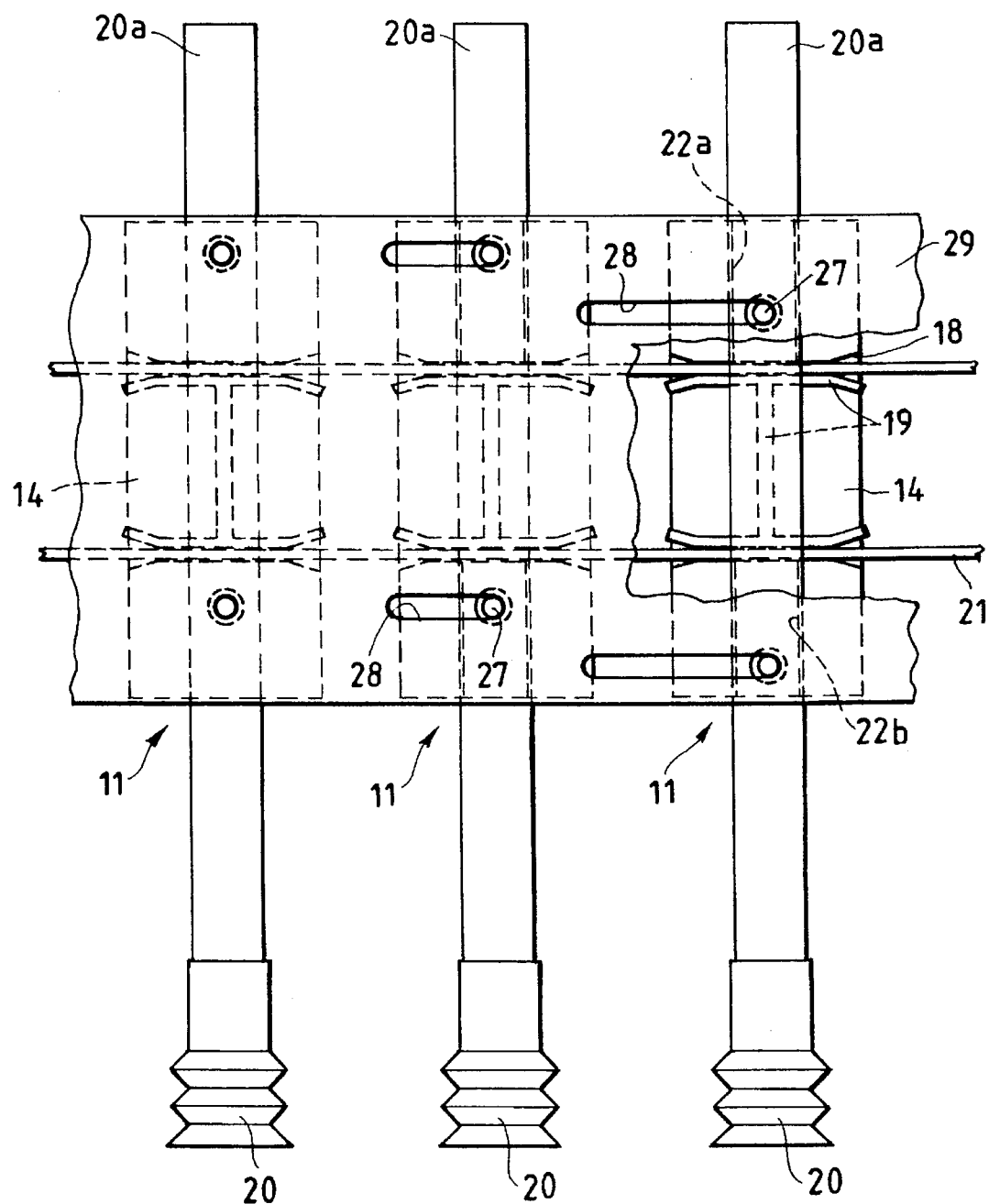
FIG. 3 is a partly sectional fragmentary front elevational view of an arrangement in one apparatus of several devices of the type shown in FIG. 1.

FIGS. 1–3 show a handling device for picking up at least one product from a first position and depositing the at least one product in a second position, which is usable in apparatus or machines for the pick-up and ordered depositing of products in at least two predetermined positions, known as pick and place machines. Specifically, it should be noted that by combining a plurality of such devices it is possible to form an apparatus which not only enables the product and/or products to be picked up and deposited but also enables them to be grouped together at predetermined distances apart.

One or more of such devices can be positioned on an apparatus structure allowing movement in both a horizontal and vertical direction such as to allow the required manipulation of the product or products, for example withdrawing them from a production machine in a spaced-apart first mutual arrangement and placing them in containers in a grouped second mutual arrangement. The structure of one of these devices, indicated overall by 11, comprises a base plate 12 on which guide elements 13 such as two profiled rails are fixed. A carriage 14 with a prismatic body is provided in its rear surface 15 with a pair of recesses 16 to receive the rails 13.

The front surface 17 of the carriage 14 comprises a double T-shaped housing 18 for receiving a complementarily shaped support element 19 with which a pick-up element 20, for example of sucker type, is rigid. The pick-up element 20 consists of a gripping element connected to control means which cause it selectively to engage a product and to release it.

The housing 18 is of such a size that besides receiving the support element 19 it can also receive a drive means or element 21, such as a belt or band, arranged for example endlessly and operated by a motor means. Specifically, the upper and lower portions of the drive element 21 are arranged above and below the ends of the support element 19. In its outwardly facing portions the housing 18 is provided with lead-ins for facilitating the insertion of the support element 19.

Two through holes 22a and 22b are provided in the body of the carriage 14 with their axes aligned vertically in correspondence with the ends of the housing 18, into them there being inserted elastic engagement elements. These comprise a pad 23 which is retained within the respective hole 22a or 22b by a disc 24 located stably in a respective seat 25 in each hole 22a, 22b. Between each disc 24 and each pad 23 there is interposed a spring 26 which determines constant elastic engagement between the pad 23 and the drive element 21. By suitably choosing the spring 26 or adjusting the position of the disc 24 within the hole 22a or 22b the friction engagement force between the pad and the drive element can be varied according to the apparatus requirements.

To the front of each pick-up element 20, or to the front of a support element therefor, for example consisting of a rod 20a, there are provided locator elements 27, such as pins, to be inserted into recesses or slots 28 provided in a slotted plate 29. The slotted plate 29 is fixed in a freely removable and replaceable manner to a base plate 12, for example by bolts, which are schematically shown, secured through openings 37. The slots 28 act as guide elements for the locator elements 27, the slot length predetermining the travel path of each of the carriages 14. In this manner, freely removable external elements are provided for determining changeable limits of a preselectable travel path, to limit the movement of the pickup elements 20.

Figure 4:
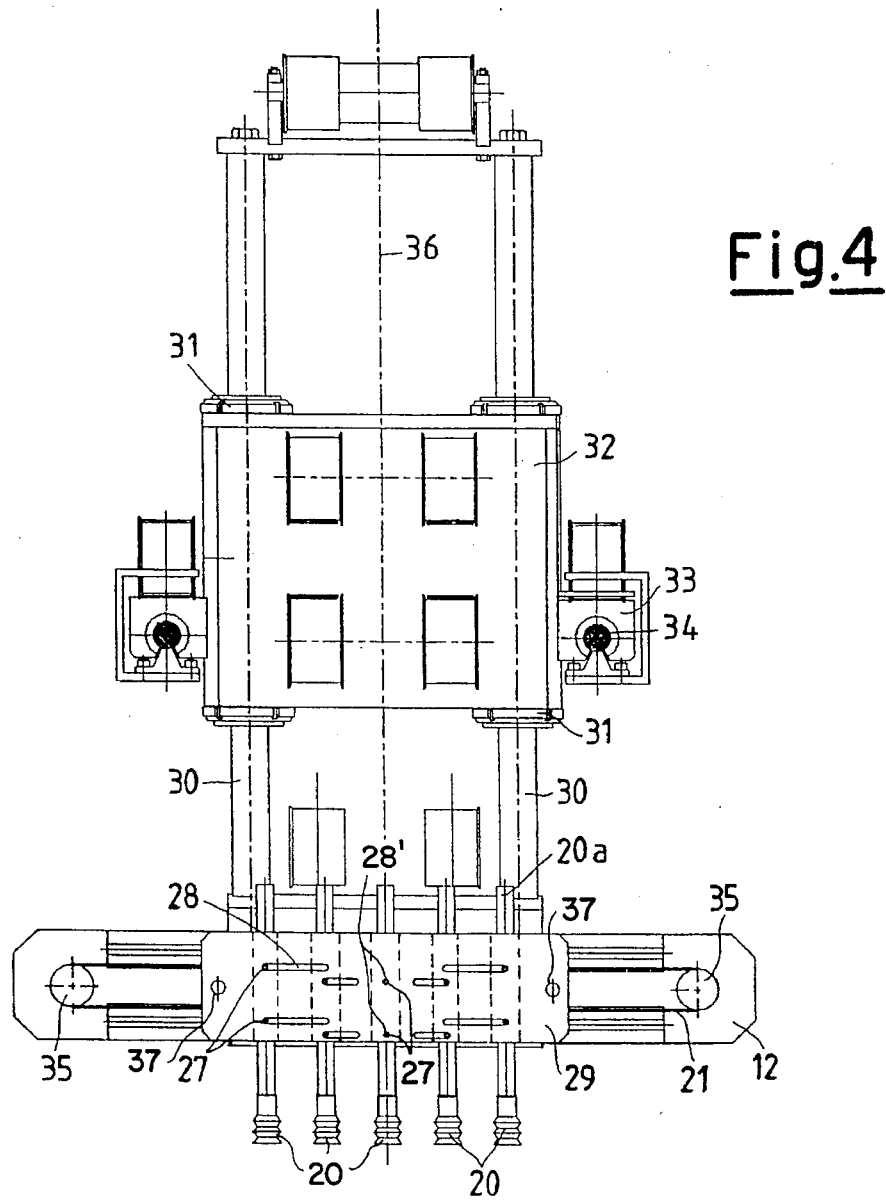
FIG. 4 is a front elevational view of an apparatus provided with several handling devices, the devices being shown in a first operating position thereof.
Figure 5:
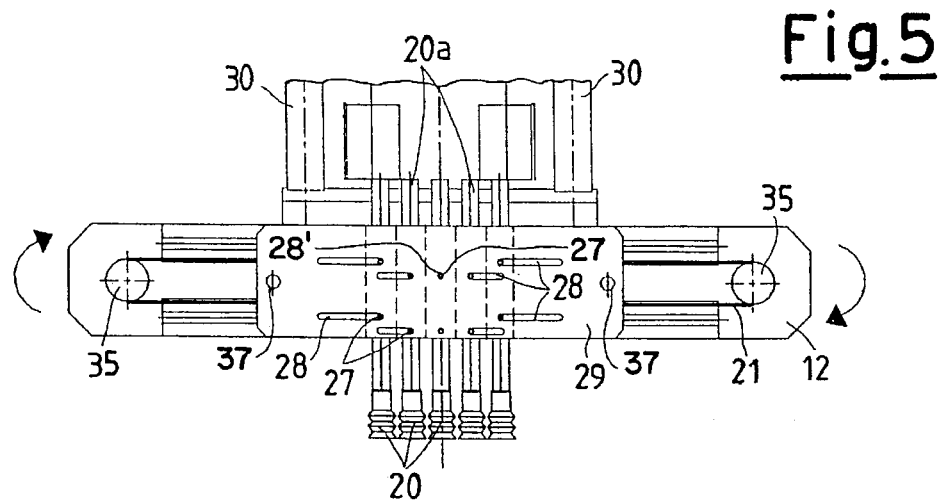
FIG. 5 is a fragmentary front elevational view of the apparatus of FIG. 4, with the devices in a second operating position thereof.

The slotted plate 29 and the locator elements 27 hence define means for selectively limiting the travel path of the carriage 14 with respect to that imparted by the drive means 21. The drive means for the carriage 14 can be simple dragging elements such as belts, bands, chains and the like, or means imparting movement to the carriage such as linear magnetic motors, electric motors, etc. FIGS. 4 and 5 show an apparatus provided with a plurality of devices 11 according to the invention.

The base plate 12 is located at the end of a pair of vertical columns 30 movable within relative guides 31 of a second carriage 32. The carriage 32 is provided with guide elements 33 projecting laterally from it and mountable on horizontal rails 34.

In this manner the carriage 32 of the apparatus can be moved horizontally for example from a first position to a second position, the plurality of devices being able to be moved vertically between a lowered position for picking up or depositing products, and a raised position for conveying products.

The drive element 21 extends as an endless flat loop about end pulleys 35 supported on the base 12, at least one of them being motorized. The plate 29 is provided with a series of slots 28 of a size defining a predetermined horizontal travel path for the pick-up elements 20. FIGS. 4 and 5 schematically show the apparatus in a first position in which the individual devices 11 are spaced apart and, respectively, in a second position in which they are grouped one to the side of the other.

It should be noted that to pass from the first to the second position the drive element 21 has to be rotated, for example, clockwise. During this clockwise rotation, the two branches of the drive element 21 move, the upper one from left to right and the lower one in the opposite direction. For this to be able to happen, the pads 23 have to be arranged such that they act on the drive element 21 all together. Hence, the pads 23 determining the engagement of those carriages 14 of the devices 11 to the left of the axis of symmetry 36 of the apparatus of FIGS. 4 and 5 have to be located in the upper holes 22a. In contrast, the pads 23 of the carriages to the right of the axis of symmetry have to be located in the lower holes 22b. The central carriage 24 can be without pads, as it remains at rest in this application. The movement from one position to the other can hence be determined by simply rotating the drive element 21 for a certain time, without regard for the fact that such a rotation can result in greater travel. In this respect, the slots themselves or rather the opposing ends of the slots act as limits, so that if the movement of the drive element 21 continues, the pads 23 slide on the drive element 21 without causing any problems.

Figure 6:
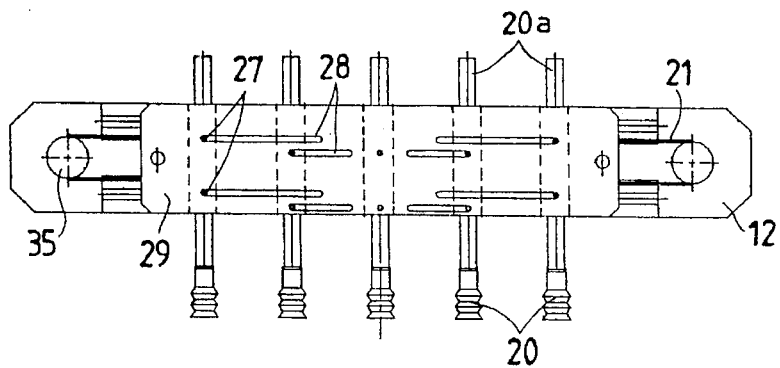
FIGS. 6, 7, 8 and 9 are schematic illustrations showing positioning modifications for the handling devices of the invention usable in respective apparatus.
Figure 7:
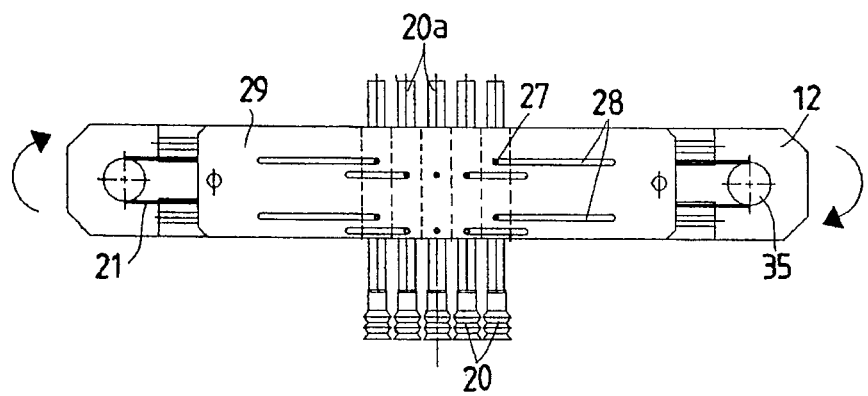

To now pass to a different handling operation in which the pick-up and deposition positions and the grouping are different, it is merely necessary to replace the plate 29 by another, such as that shown in FIGS. 6 and 7.

It should be noted that the plates 29 are extremely simple to replace as they are fixed only to the base plate 12, for example by bolts, which are schematically shown. The locator elements 27 have simply to be inserted into the respective slots 28, and the various devices and their component equipment are immediately ready to effect a different pick-up and deposition operation plus grouping. In order to be able to effect the largest possible movements or travel paths, successive slots 28 into which to insert the locator elements or pins 27 of successive pick-up elements 20 are located at different heights in the plate 29. Correspondingly, the locator elements 27 on successive handling devices 11 must be at a different height on the rod 20a of the pick-up elements 20. As seen heretofore, some of the devices in a particular application can be maintained fixed, by providing simple holes 28' in the plate 29.

FIGS. 6 and 7 hence show how the plate 29 can carry longer slots 28 than those shown in FIGS. 4 and 5, while maintaining five individual devices 11.

Figure 8:
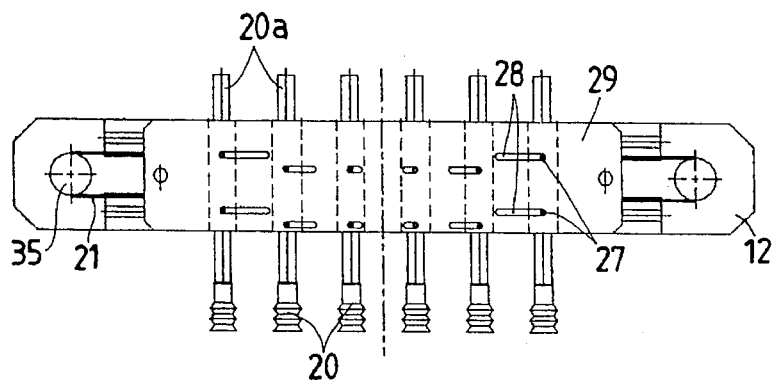
Figure 9:
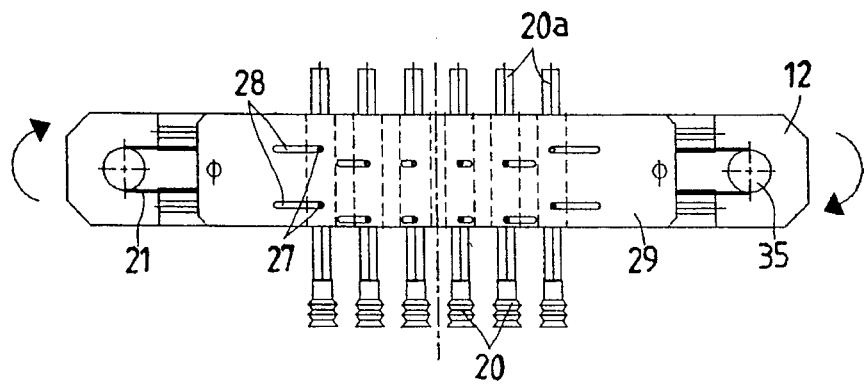

FIGS. 8 and 9 show a handling apparatus in which the devices are six in number.

Such an apparatus is formed for example by removing the slotted plate 29 of FIGS. 4, 5 or 6, 7, and mounting on the guide elements 13 a further device 11 identical to that previously used as the fixed central device in FIGS. 4, 5 or 6, 7. A slotted plate 29 must then be mounted carrying a number of slots 28 equal to the number of locator elements 27 located on the six pick-up elements 20 now used. The plate 29 acts as an external element for determining or delimiting the carriage travel path as preselected for the particular application.

At this point the apparatus is ready for operating in a manner extremely fast and economical, including from the layout aspect.

I claim:

1. A product-handling device arrangement for a pick and place machine, comprising:

a base plate having at least one horizontally oriented rail;

an endless belt drive mounted on said base plate and operable for providing motive power in two opposite directions parallel to said rail;

at least one product handling device including:

a carriage supported on said base plate for movement along said rail;

an engagement element mounted on the carriage and resiliently loaded into driven engagement with said endless belt drive, for being slippably driven in both said directions;

a guide pin fixed to the carriage; and a vertically oriented product pick-up element for releasably gripping a prospective product;

a slotted guide plate mounted to the base plate and having for each said carriage, a horizontally elongated slot receiving a prospective said pin and having two opposite ends disposed for defining limits to horizontal travel of the respective carriage;

the endless belt drive being operable for causing each engagement element to move the respective carriage in one direction until the respective pin engages the respective end of the respective slot, and being operable to drive each engagement element to move the respective carriage in an opposite direction until the respective pin engages the respective opposite end of the respective slot, further operation of the endless drive belt in a same mode after the respective engagement element has engaged a slot end, being accommodated by slippage between the respective engagement element and the endless belt drive.

2. The arrangement of claim 1, wherein:

said slotted guide plate is removably and easily exchangeably mounted to said base plate by removably mounting means, so that it can be exchanged for a like plate having for at least one carriage a slot of different length than provided on said slotted guide plate.

3. The arrangement of claim 1, further including:

a second carriage mounted for vertical movement along at least one vertical column; and at least one second horizontal rail extending orthogonally to said rail, said at least one vertical column being supported on said set of horizontal rails for reversible travel therealong;

said base plate being mounted to said second carriage for reversible vertical travel along said at least one vertical column, whereby a product picked-up by a respective product pick-up element can be moved in two mutually orthogonal directions, lifted and lowered, for desired placement thereof.

4. The apparatus of claim 1, wherein:

there are a plurality of said devices;

the slotted guide plate has an axis of symmetry with at least one said slot arranged in corresponding locations on either side thereof;

the endless belt drive including an endless belt having an upper run and a lower run;

each device located on one side of said axis of symmetry having the engagement element thereof disposed in driven contact with one of said runs, and each device located on the opposite side of said axis of symmetry having the engagement element thereof disposed in driven contact with the other of said runs.

5. The apparatus of claim 4, further comprising:

said slotted guide plate having a non-elongated hole formed therein on said axis of symmetry;

a further product handling device including:
  a carriage supported to said base plate;
  a guide pin fixed to the carriage of said further product handling device; and
  a vertically oriented product pick-up element for releasably gripping a respective product;

said guide pin of said carriage of said further product handling device being received in said hole of said slotted guide plate.

6. The apparatus of claim 4, further comprising:

a second carriage mounted for vertical movement along at least one vertical column; and at least one second horizontal rail extending orthogonally to said rail, said at least one vertical column being supported on said set of horizontal rails for reversible travel therealong;

said base plate being mounted to said second carriage for reversible vertical travel along said at least one vertical column, whereby a product picked-up by a respective product pick-up element can be moved in two mutually orthogonal directions, lifted and lowered, for desired placement thereof.

* * * * *